(No Model.) 2 Sheets—Sheet 1.

J. W. BALET.
METHOD OF REGULATING ELECTRIC CURRENTS.

No. 400,726. Patented Apr. 2, 1889.

WITNESSES:
C. Sedgwick
J. M. Ritter

INVENTOR:
J. W. Balet
BY Munn & Co
ATTORNEYS.

(No Model.) 2 Sheets—Sheet 2.
J. W. BALET.
METHOD OF REGULATING ELECTRIC CURRENTS.

No. 400,726. Patented Apr. 2, 1889.

WITNESSES:

INVENTOR:

BY

ATTORNEYS.

UNITED STATES PATENT OFFICE.

JOSEPH W. BALET, OF NEW YORK, N. Y., ASSIGNOR OF ONE-HALF TO ROBERT DUNLAP AND LUKE F. COZANS, OF SAME PLACE.

METHOD OF REGULATING ELECTRIC CURRENTS.

SPECIFICATION forming part of Letters Patent No. 400,726, dated April 2, 1889.

Application filed January 21, 1888. Renewed March 9, 1889. Serial No. 302,743. (No model.)

*To all whom it may concern:*

Be it known that I, JOSEPH WILHELMUS BALET, a subject of the King of the Netherlands, at present residing in the city, county, and State of New York, have invented a new and Improved Method of Regulating Electric Currents, of which the following is a specification, reference being had to the annexed drawings, forming a part thereof, in which—

Figure 1:
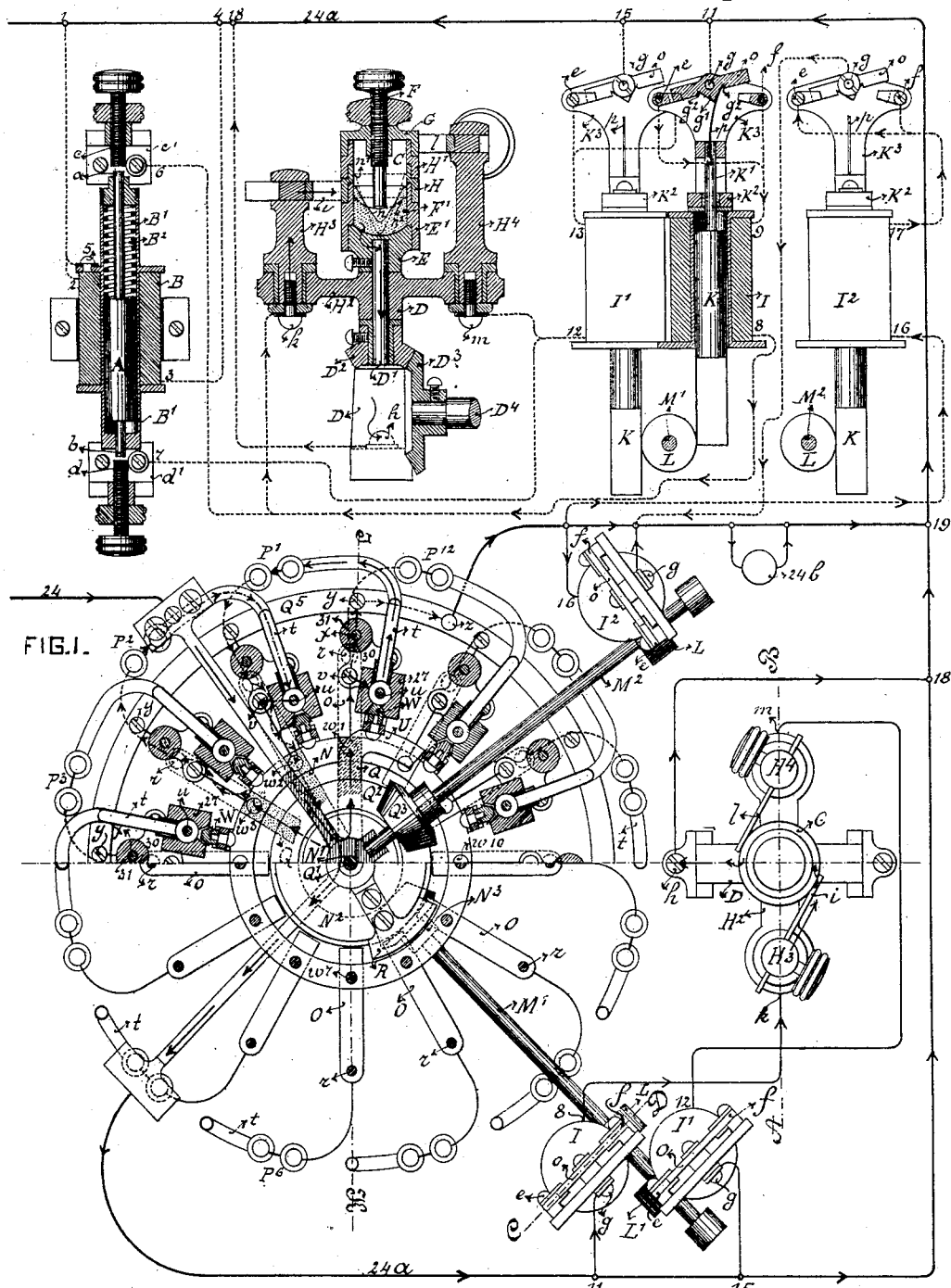
Figure 2:
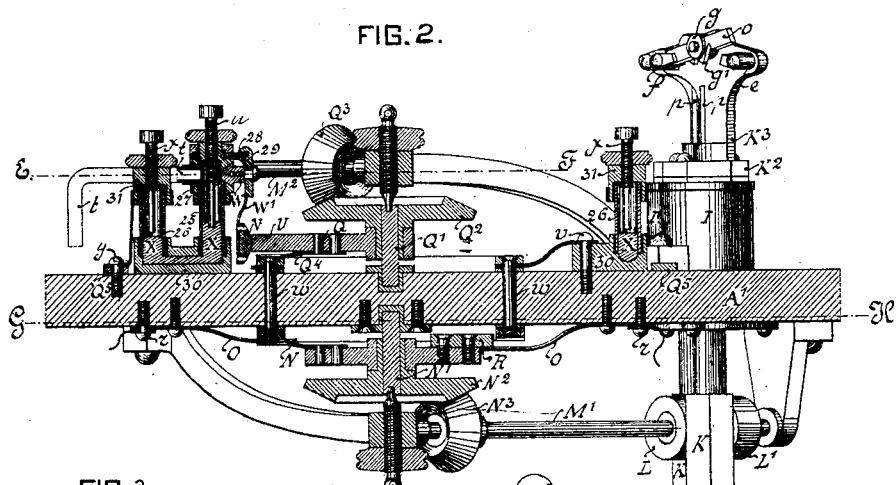
Figure 3:
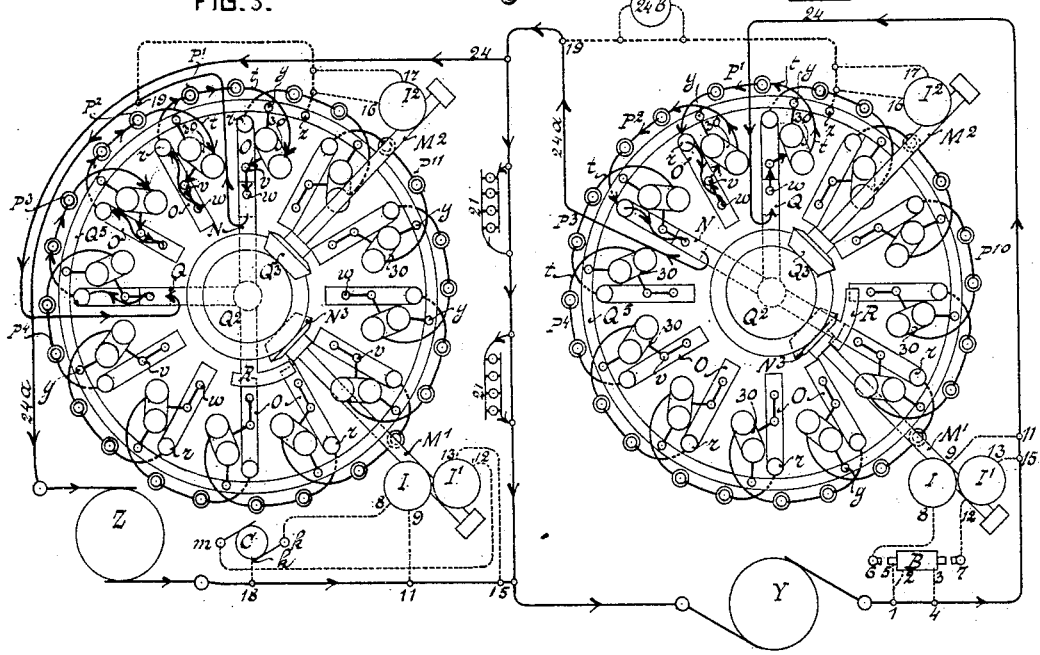

Figure 1 is a general view of my apparatus for regulating electric currents, showing a central vertical section of the circuit-controller, a vertical transverse section of the current-regulator, a side elevation of the switch-actuating mechanism, showing one of the solenoids and parts connected therewith in longitudinal section, a side elevation of auxiliary switch-actuating mechanism, a plan view, partly in section, of the current-distributing mechanism and secondary batteries, a plan view, partly in section, of the circuit-breaking mechanism, a plan view of the centrifugal regulator, a plan view of the switch-actuating mechanism, and a plan view of the auxiliary switch-actuating mechanism and sounder. Fig. 2 is a vertical section taken on line J K of Fig. 1; and Fig. 3 is a plan view of the entire apparatus, showing the devices for governing the current of the electric motor, the method of governing the current of the dynamo, the apparatus for governing the current of the cells, and the apparatus for governing the charging of the storage-batteries.

Similar letters of reference indicate corresponding parts in all the views.

The object of my invention is to provide a method of regulating the current in dynamo and motor circuits by which the current not used and any surplus of current will be sent into storage-batteries to be stored for future use when the main current from the dynamo becomes weakened or ceases altogether, and to control the charging of the secondary batteries, so that the charging-current shall cease in a particular battery when the maximum charge is reached and be returned to the said battery when it is discharged.

My improved method of controlling the current will be described in connection with the mechanism, and will be afterward pointed out in the claims.

The electrical connections shown in the drawings are intended when a very heavy current is flowing through the main conductor. I do not, however, limit myself to such, for the connections are to be made according to the strength of the current flowing through the main conductors.

In Fig. 1 is shown a circuit-controller, which is dependent for its action upon the main current. It consists of a solenoid, B, provided with a tubular core, B', to which is fitted a soft-iron armature, A. The ends of the tubular core B' are closed, with the exception of a small central opening through which project the rods $a\ b$ from the ends of the armature A. Surrounding the rod $a$, and between the armature A and the closed end of the tubular core B', there is a spiral spring, $B^2$, which opposes the inward movement of the armature A. Opposite the end of the rod $a$ is supported a contact-screw, $c$, by a standard, $c'$, and opposite the rod $b$ is supported a contact-screw, $d$, by the standard $d'$. The terminals 2 3 of the solenoid B are connected with the main conductor $24^a$ at 1 and 4. A branch of the terminal 2 is connected electrically by the screw 5 with the core B' of the solenoid, and is thus in electrical communication with the armature A and rods $a\ b$. The standards $c'\ d'$ are provided with binding-screws 6 7. When the current in the main conductor $24^a$ energizes the solenoid B, so that the armature A is held in equilibrium, as shown in the drawings, no contact is made between the rods $a\ b$ and the screws $c\ d$; but when the current is too strong the armature A is drawn into the solenoid against the pressure of the spring $B^2$ and causes the rod $a$ to make a contact with the screw $c$. When the current is too weak, the armature A is released, and the spring $B^2$ carries the armature A forward, so as to bring the rod $b$ into contact with the screw $d$.

In Fig. 1 is shown a centrifugal governor, which is operated by the motor driven by the current from the main conductor $24^a$. To the motor is secured a frame, D, containing a spindle, D', carrying at its lower end a pinion, $D^2$, which is engaged by a bevel-wheel, $D^3$, on the shaft $D^4$ of the electric motor. To the upper end of the spindle D' is secured a head, E, to which is attached a hollow cylindrical shell, E', of insulating material, the upper end of the shell being rabbeted to receive the metallic ring H, and to the rabbeted upper edge of the metallic ring is secured an insulating-ring, H', which supports a cap, G, in the center of which is placed the contact-screw F. The receptacle thus formed contains a body, F', of mercury, and the space above the mercury in the chamber C is filled with mercurial vapors, which prevent the metal from being burned by sparking between the contacts. The mercurial vapor is generated by heat, the mercury being poured into the chamber C while hot through the hole in which the contact-screw F is inserted. After the mercury is poured in, and before it cools, the screw F is inserted and the jam-nut on the said screw is tightened, thereby practically sealing the mercury in the chamber C. The vapor from the hot mercury drives out all the air, and when most of the vapor has condensed there is a partial vacuum in the chamber C containing mercury-vapor only.

To the cross-arm $H^2$ are secured two vertical posts, $H^3$ $H^4$, which are insulated from the cross-arm and are provided with binding-screws $k$ $m$. The posts $H^3$ $H^4$ are mortised transversely at their upper ends, and the post $H^3$ supports a brush, $i$, which touches the metallic ring H, and in the mortise of the post $H^4$ is secured a brush, $l$, which touches the metallic cap G. The frame D is provided with a binding-screw, $h$. When the motor is revolving at its normal speed, the mercury in the chamber C assumes the form indicated by the line $n$ and the circuit remains open; but when the speed of the motor rises above the normal the mercury assumes the form indicated by the dotted line $n'$ and establishes communication between the metallic ring H and the spindle D', and when the speed falls below the normal the mercury assumes the form indicated by the dotted line $n^2$, thus establishing a contact between the end of the screw F and the spindle D'.

In Fig. 1 are shown the switch-actuating devices, which are exactly alike, the parts being indicated by the same letters of reference, so that a description of one will answer for all. To the solenoid I is fitted a movable core or armature, K, provided with the rod K', extending through a cap, $K^2$, and carrying at its upper end a flat spring, $p$. To the frame $K^3$, attached to and extending above the top of the solenoid, is pivoted a switch-lever, $o$, which is capable of making contact with either of the contact-pieces $e f$. The lever $o$ is provided with a rectangular projection, $g'$, and with notches $g^2$ at opposite sides of the said rectangular projection. The angle of the projection is opposite the pivot $g$, and when the armature K rises, being magnetized by the passage of the current through the solenoid I, it causes the spring $p$ to enter one of the notches $g^2$ and push the lever $o$ into contact with one of the contact-pieces $e f$. When the armature K again rises, it causes the spring $p$ to engage the other notch $g^2$ and shift the lever $o$ to the other connection. In this manner the lever $o$ alternates in its movement with every upward stroke of the armature K and makes and breaks the circuit of the solenoid I. The armature K is prolonged below the solenoid I and is flattened for engagement with a roller, L, of magnetic material, mounted upon and insulated from the shaft M. Whenever the armature K is magnetized by the current passing through the solenoid I, the said armature is moved upward, and, the roller L being magnetized by induction from the armature K, the frictional contact thus established causes the roller L to turn whenever engaged by the armature in the manner indicated. While the current passes through either of the solenoids, the armature K keeps up a continual longitudinal vibration, shifting the lever $o$ alternately from one of its electrical contacts to the other, turning the roller L and shaft M'.

When the bar $b$ of the controller B makes contact with the contact-point $d$, or when the body of mercury in the centrifugal regulator makes contact with the screw F, and the current flows through the brush $l$, post $H^4$, to the contact-screw $m$, the current enters the coil I' at 12 and the armature K vibrates. When the bar $a$ makes contact with the contact-point $c$ of the controller, or the body of the mercury in the centrifugal regulator makes contact with the brush $i$, and the current can flow through the post $H^3$ to the connection $k$, the current enters the coil I at 8 and the armature K of the said coil vibrates.

The switch operating and distributing mechanism is provided with a series of contacts, $w$, which extend through the frame of the machine and are arranged to be touched upon their upper ends by the arm Q and upon their lower ends by the arm N. The arms N Q are placed upon shafts N' Q', which are axially in line with each other, but insulated from each other. The shaft Q' is provided with a bevel-wheel, $Q^2$, which is engaged by a bevel-pinion, $Q^3$, on a shaft, $M^2$, journaled in the frame of the machine and extending beyond the said frame, where it is provided with the iron roller L, which is engaged by the armature K of the solenoid $I^2$. Upon the shaft N', which carries the arm N, is placed a bevel-wheel, $N^2$, which is engaged by a bevel-pinion, $N^3$, on the shaft N', the said shaft extending beyond the frame of the machine, where it is provided with two iron rollers, L L', the roller L being engaged by the armature K of the solenoid I, and the roller L' being engaged by the armature K of the solenoid I'. The arms N and Q receive the current from the conductor 24, as shown in Figs. 1 and 2. The conductor 24 is connected with the frame, and the current goes from the frame to the shaft N' and thence to the arm N.

In the circuit-breaking mechanism the arm

N carries a sector, R, of non-conducting material, whose lower surface is curved, so as to be capable of sliding over the contact-springs $o$ to lift the said springs from the contacts $w$ in alternation. After the sector R passes one of the contact-springs $o$ the said spring $o$ returns to its normal position and touches the contact $w$. Thus the secondary batteries are prevented from being short-circuited or having the circuit closed upon themselves.

With each contact $w$ is connected, electrically, a valve, 30, by a wire running from the said contact to the binding-screw $v$. Each valve is provided with a base-piece, in which are inserted tubes 25 26, of insulating material, and in the base-piece is formed a passage connecting the two tubes. To the top of the tube 25 is fitted a cap, 27, in which is inserted a screw, $u$, and also a pipe, $t$, communicating with the interior of the tube, and in that side of each valve which adjoins the central part of the device is formed a valve-seat, to which is fitted a valve, W, the said valve W being connected with the spring-lever W', pivotally supported by the arm 28, the lower end of the lever W' being provided with a convex wearing-plate, V, of insulating material, which is engaged by the curved end U of the arm Q. The lever W' is pressed by a spring, 29, which tends to open the valve W. The tube 26 is provided with a cap, 31, to which is fitted a screw, $x$, extending downward in the insulating-tube 26. The lower part of each tube 25 26 and the passage communicating between the two is filled with a body, X, of mercury. The space over the mercury in the tube 26 contains air under sufficient pressure to press the mercury out of contact with the screw $x$ and to cause it to make contact with the screw $u$. The base in which the tubes 25 26 are inserted being of conducting material, the current can pass from the binding-screw $v$ to the mercury. The space above the mercury in the tube 26 communicates through a pipe, $t$, with the storage-batteries connected with the same contact, $w$, that communicates with the valve 30.

In the branch $z$ 19 of the auxiliary main circuit is connected a sounder, $24^b$, which makes known when a set of storage-batteries have received their maximum charge, and shows at the same time by a number which set of storage-batteries it is. For this any of the well-known existing devices can be used.

Surrounding the distributing apparatus is a series of storage-batteries, P' to $P^{12}$, inclusive. The current arrives at the distributer through the conductor 24, which communicates with the arm Q, and the current passes from the arm Q through the spring $Q^4$ to the contact $w$, thence to the binding-screw $v$ of the valve 30, thence to the mercury X, to the screw $u$, and through the pipe $t$ to the storage-battery P', which may consist of a number of cells, thence through the binding-screw $r$ and the contact-spring $o$ and contact $w$ to the lever N, thence by the conductor $24^a$ back to the generator. The solenoid $I^2$ is placed in the shunt $z$ 19 between the frame $Q^5$ and the main conductor $24^a$.

When the storage-battery P' becomes charged, it begins to give off gas, which passes through the pipe $t$ and presses upon the surface of the mercury X in the tube 25, causing it to recede from the point of the contact-screw $u$ and make contact with the screw $x$. By this means the current is switched out of the battery-circuit and into the circuit of the solenoid $I^2$, the current passing from the binding-screw $v$ through the mercury X, contact-screw $x$, binding-post $y$, and frame $Q^5$, partly, to the terminal 16 of the solenoid $I^2$, when the armature K of the solenoid begins immediately to vibrate and turn the shaft $M^2$, so as to cause the arm Q to pass onto the next contact $w$, and at the same time to close the next valve W in order by the engagement of the wearing-plate V with the curved end U of the arm Q. After passing the valve 30 belonging to the storage-battery first charged the curved end U of the arm Q passes the wearing-plate V of the spring W' and allows the valve W connected therewith to open, allowing the gas to escape, thus permitting the mercury to return to its normal position in contact with the screw $u$; also, during the operation of the solenoid $I^2$ a current will pass through the sounder $24^b$ in Fig. $4^a$, and a number is indicated showing which set of storage-batteries is charged. So long as the current in the main circuit is normal, or the speed of the motor is normal, the current arrives at the distributer through the conductor 24, which communicates with the arm Q, and the current passes from the arm Q through the spring $Q^4$ to the contact $w$, thence to the arm N, and through the conductor $24^a$ back to the generator. So long as the current in the main circuit is above the normal the rod $a$ in the controller remains in contact with the screw $c$, and so long as the speed of the motor is so high as to cause the mercury, F', contained in the regulator to make contact with the ring H the current flows through the solenoid I, and the vibratory motion of the armature K of the said solenoid causes the shaft M' to revolve in the manner already described, constantly turning forward the arm N and bringing in more and more storage-batteries P' $P^2$, &c., until the current is reduced to its normal state. When the armature A occupies the position of equilibrium between the points $c$ $d$, and the mercury in the receptacle C takes the form indicated by the line $n$, then the current ceases to flow through the solenoid I and the arm N remains stationary. When the speed of the motor is reduced so that it is less than normal, it causes the mercury, F', contained in the regulator to make contact with the screw F, and when the current falls below the normal, the armature A in the circuit-controller being released, the spring $B^2$ carries the armature forward, so that the rod $b$ makes contact with the screw $d$, and the current flows through the solenoid I', when the armature of the said solenoid, by engagement with the roller L' on the shaft M', causes the arm N to move in a reverse direction, and the storage-batteries are shut out. If, then, the arm continues its motion, the position of the arms N Q relative to each other is shifted, and the current flows in the opposite direction, as indicated by the dotted lines in Figs. 1 and 3, which coincides with the direction of the current of the storage-batteries, thus assisting the main current in doing its work. In this manner the current is diverted into the secondary batteries P' $P^2$ $P^3$, &c., and a larger or smaller number of batteries are switched in, depending on the requirements of the circuit, as indicated by the controller and the regulator.

On the left of Fig. 3 is shown the method of regulation for the electric motor, in which Z represents the electric motor, and the connections and mechanism are indicated with the same letters of reference in all the figures.

On the right of Fig. 3 is shown the method of regulation for the dynamo or any other electrical generator, in which Y represents the dynamo or other generator, the connections and mechanism being indicated with the same letters of reference in all the figures.

On the right of Fig. 3 is also shown the method of regulation when the charging of storage-batteries only is required.

The current arrives at the distributer through the conductor 24, charges the storage-batteries P' $P^2$, and flows through the conductor $24^a$ back to the generator, and the number of storage-batteries included in the charging-current is governed by the controller B and by the other mechanism, as previously described. When a set of storage-batteries is charged, the current flows through the conductor $z$ 19, and the storage-batteries are cut out of the charging-circuit in the manner above described.

When my device is used in connection with railroad-cars, the power to drive the dynamo Y is derived from the axle of the car for the production of light. The surplus of current is stored in the accumulators P' $P^2$ in the manner described, and when the car stops the charged storage-batteries sustain the lights in the car. The arrangement shown on the right of Fig. 3 will answer this purpose, doing the work automatically and with such accuracy that no alteration in the current or the power of the lights is observable. The solenoid I' and connected mechanism operate the circuit then in the manner described.

An electric system whose electric power is distributed during the day and electric lighting is effected in the evening by the same generator, Y, is shown in Fig. 3. The governing system of the dynamo will keep the current constant during day-time, and by the governing system of the motor storage-batteries are loaded. Now, during the interval between the early hours of evening and the closing hours of work the motor Z runs and the lamps 21 are shut into the circuit, and the current to drive the motor Z goes below normal when the centrifugal regulator C throws the current into the solenoid I', and by the mechanism connected therewith and the arm N the charged storage-batteries $P^3$ $P^2$, &c., are shut into the circuit, the direction of their current coinciding with the direction of the main current, as shown, and the power is supplemented at the time and place where it is needed; also, the governing system of the dynamo Y operates to shut into the main circuit the number of charged storage-batteries required, and the dynamo is not overstrained and a practically uniform current is maintained. When at close of work the electric motor Z is stopped and said motor, together with its governing mechanism, is cut out of the circuit, the dynamo Y only sustains the lamps 21, and now the surplus of current loads the storage-batteries, which can be employed for independent uses—for instance, to run street-cars—and a uniform current will be maintained throughout, a uniform power will be required to drive the dynamo, and the engine driving the dynamo and the dynamo themselves are not subjected to any overstraining, doing a uniform amount of work, which allows of the use of large economical engines in preference to engines which are less economical in use, but very sensitive as to speed and power, equalizing the work.

In Fig. 3 the storage-batteries are connected in series with the main circuit; but I do not limit my invention to this manner of connection, as the storage-batteries may be connected into a shunt with the main circuit or any of the well-known ways.

The advantages of my improvement are that in switching-in resistance, consisting of storage-batteries for the controlling of the current in the main circuit, I am enabled to conserve the current for future use to assist the main current, or for use independently of the main current.

My improvement finds one of its principal applications in electric systems where electric power is distributed during the day and electric lighting is effected in the evening by the same generator or by the same circuit.

By controlling the current during the day by the use of the storage-batteries I am enabled during the interval between the early hours of evening and the closing hours of work to supply sufficient current to the main circuit to supplement the current from the dynamos on the circuit, so as to maintain a practically uniform current, although lights and motors may be running at the same time, and when the evening advances the electric plant gradually acquires more energy than is utilized in producing the light, and this surplus of energy with my system can be used for charging storage-batteries for independent purposes—for example, for propelling street-cars.

In addition to the uniform flow of current secured by my improvement, I effect a more thorough and equal regulation of the motor, and I avoid overstraining the dynamo by frequent and great fluctuations in the current.

Another advantage is that I supplement the current from the dynamos at the place where the current is most needed.

My improved governing device switches into the circuit the exact number of storage-batteries required to assist the main current or to do the work done by the main current.

Another advantage is that I waste no current whatever for governing purposes, and I bring the use of the current to the highest point of economy, enabling me to gain so much that I am able to compete successfully in the generation and distribution of power with small steam-engines—say from one to ten horse-power.

When my governing method is applied to the charging of storage-batteries only, I secure the following advantages: first, the avoidance of overcharging the batteries and wasting energy; second, the avoidance of the batteries overpowering the generator and changing the polarity of the generator; third, avoiding the burning of the armature of the generator by short-circuiting, and, fourth, the apparatus indicates when the storage-batteries are charged.

When my governing method is applied in those cases where batteries constitute the source of electricity, I secure the advantage of wasting no energy.

By my improved method the storage batteries are not overcharged, and the attendant is informed when the batteries have received their maximum charge.

Having thus described my invention, I claim as new and desire to secure by Letters Patent—

1. The method of regulating electric currents automatically, which consists in conveying the main current or a portion of the main current into one or more storage-batteries, so as to absorb the surplus energy of the main current when the main current is too strong to do the work, and adding the current of as many storage-batteries to the main current as may be necessary to supply the deficiency of electrical energy in the main circuit when the main current is too weak to do the work, substantially as specified.

2. The method of regulating electric currents automatically, which consists in conveying the main current or a portion of the main current into storage-batteries, so as to absorb the surplus energy of the main current when the main current is too strong to do the work, and cutting out the fully-charged storage-batteries from the charging-current by causing the circuit of the charged batteries to open and disconnecting the storage-batteries from the main circuit when the main current corresponds to the work to be done, substantially as specified.

3. The method of regulating electric currents automatically, which consists in conveying the main current or a portion of the main current into storage-batteries, so as to absorb the surplus energy of the main current when the main current is too strong to do the work, and cutting out the fully-charged storage-batteries only from the charging-current by causing the circuit of the charged batteries only to open when a charging-current will flow through them, and disconnecting the storage-batteries from the main circuit when the main current corresponds to the work to be done, and adding the current of the storage-batteries to the main current as may be necessary to supplement the deficiency of energy of the main current when the main current is insufficient for the work to be done, substantially as specified.

4. The method of regulating electric currents automatically, which consists in conveying the main current or a portion of the main current into storage-batteries, so as to absorb the surplus energy of the main current when the main current is too strong to do the work, and disconnecting the storage-batteries from the main circuit when the current in the main circuit corresponds with the work, and adding the current of as many storage-batteries as may be necessary to the main current to supply the deficiency of energy of the main current when the main current is too weak to do the work, substantially as described.

JOSEPH W. BALET.

Witnesses:
GEO. M. HOPKINS,
EDGAR TATE.